Oct. 31, 1967           J. R. KOHR           3,350,638

AMPERE-HOUR METER

Filed Oct. 24, 1963

3,350,638
AMPERE-HOUR METER
Joseph R. Kohr, Philadelphia, Pa., assignor, by mesne assignments, to ESB Incorporated, Philadelphia, Pa., a corporation of Delaware
Filed Oct. 24, 1963, Ser. No. 318,667
4 Claims. (Cl. 324—94)

ABSTRACT OF THE DISCLOSURE

An ampere-hour meter comprising a meter case, an upper electrode attached to the back of the meter case and in contact with an electrolyte containing mercury ions, a lower electrode also attached to the back of the case and covered with mercury in a reservoir at the bottom of the case, pivotally mounted cup means located between the upper and lower electrodes and positioned so as to catch mercury dropping from said upper electrode in such a manner that the mercury unbalances the cup means causing it to rotate, and indicator means attached to the cup means. This ampere-hour meter is useful for indicating the state of charge of an electric battery electrically connected thereto, it is inexpensive and easy to reset, and it has a rugged construction making it suitable for installation on motive vehicles.

---

This invention relates to an ampere-hour meter and in particular it relates to an inexpensive ampere-hour meter designed for stationary use or for use on moving vehicles and which has a good degree of accuracy and is readily reset.

In the operation of an electric storage battery, it is often necessary to determine how much charged capacity remains in the battery or how much of the useful battery capacity has been discharged. In order to make such a determination, those skilled in the art use an ampere-hour meter, sometimes referred to as a discharge indicator, which is electrically connected to the battery and which can be calibrated to indicate how much of the battery's capacity has been used or remains to be used. In some instances, an ampere-hour meter may be used to control the charging of a battery, that is, it can be used to make the charging system automatic. Various types of ampere-hour meters have been developed, but those having a high degree of accuracy are generally quite expensive.

It is an object of this invention to provide a novel ampere-hour meter construction.

Another object of the invention is to provide an ampere-hour meter which is inexpensive, easy to reset, and which has a good degree of accuracy.

Other objects and purposes of this invention will be apparent to those skilled in the art in view of the description which follows, and in particular, by referring to the drawings in which.

Figure 1:
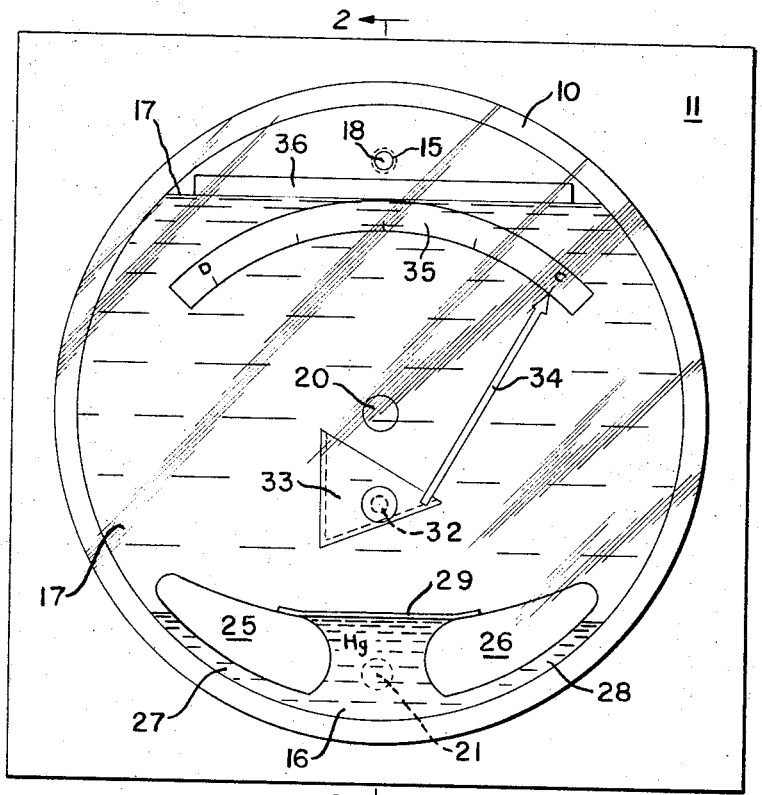
FIGURE 1 is a front view of an ampere-hour meter of this invention.

A relatively inexpensive ampere-hour meter has been invented which can be used to determine the state of charge of either stationary batteries or batteries placed on moving vehicles. An ampere-hour meter of this invention comprises a plastic meter case, which may be molded in two parts, having a transparent face to enable one to read a scale and a pointer within the meter case. In the back piece of the meter case or in the transparent face piece, there is a filling hole through which mercury and/or electrolyte may be poured and sealed within the meter case. Inserted or molded into the back of the meter case are two electrodes and bearing surfaces are provided on the inner meter case surfaces below the upper electrode for a pivoted shaft upon which an attached plastic cup can rotate. Near the bottom of the meter case, two plastic pieces are positioned near the edge of the case in such a manner that they form the sides of a mercury reservoir, and these plastic pieces also form two channels with the edge of the meter case which channels are used to return mercury to the mercury reservoir. The lower electrode projects into the mercury reservoir, and there must be sufficient mercury in the reservoir that the lower electrode remains covered with mercury throughout the operation of the ampere-hour meter. The mercury reservoir is covered by a porous diaphragm which permits the passage of mercury ions into the electrolyte but which confines the elemental mercury when the ampere-hour meter is subjected to vibration. The mercury reservoir is filled with mercury and the meter case is filled with an electrolyte containing mercury ions up to a baffle plate positioned near the top of the case. The baffle plate suppresses the movement of the liquid electrolyte when the ampere-hour meter is subjected to vibration, and it also indicates when the meter is not level which would cause an error in the indicated state of charge.

A cup element is firmly attached to the pivoted shaft in the bearings located below the upper electrode in such a manner that it can rotate on the pivots. Firmly attached to the cup element is a light weight pointer which is colored for clear visibility. The pointer points to a scale which may be attached near the top of the back of the meter case, or it can be molded into or attached to the transparent face piece. The scale indicates whether the battery is fully charged, partially charged or completely discharged. The shape and balance of the cup element can be calibrated so as to produce a linear scale or an expanded scale type of meter.

The meter case is inserted into or fastened to a mounting plate in such a manner that it can be freely rotated. The reason for mounting the meter case in a rotatable manner is that mercury which collects in the cup element during the discharging of the battery can be emptied from the cup element back into the mercury reservoir by inverting or rotating the meter about 180° for easy and quick resetting. The electrolyte is present in the meter case in a limited amount so that when the meter is inverted, the electrical circuit through the ampere-hour meter is broken because the lower electrode is out of electrical contact with the mercury and the electrolyte. In this manner, no reverse current will flow through the meter during the charging of the battery.

The ampere-hour meter is electrically connected to the current carrying circuit of the battery whose state of charge is being measured. The meter may be connected to the circuit by means of a suitable shunt and adjusted to the proper ampere-hour capacity by means of a series resistor. If desired, an inexpensive diode can be placed in the circuit to block reverse current through the ampere-hour meter, such as a charging current. In this manner, the need for electrically disconnecting the meter during charging of the battery may be eliminated. In addition, the ampere-hour meter may be calibrated to compensate for its temperature differential caused by its internal resistance in order to increase its accuracy.

The ampere-hour meter of this invention operates on the principle that as current is passed through the meter, the upper electrode will donate electrons to the mercury ions in the electrolyte, and mercury will be plated out or deposited on the upper electrode in proportion to the amount of current passing through the meter. The mercury ions taken from the electrolyte are replaced by mercury ions which are formed in the mercury reservoir and which pass through the ion permeable membrane into the electrolyte. As the mercury accumulates on the upper electrode, it drops off into the cup element located below the upper electrode. When the cup element is empty, the pointer which is firmly attached to the cup element points to an indicator on the scale showing that the battery is fully charged. As mercury drops into the cup element it becomes unbalanced and rotates about a bearing or pivot. The cup element and pointer can be calibrated so that when the battery is completely discharged the amount of mercury deposited in the cup element will rotate the cup element and pointer to a position where the point r indicates on the scale that the battery is discharged. The amount of mercury which will be deposited in the cup element is readily calculated knowing the charge capacity of the battery. After the battery has been completely discharged, the ampere-hour meter can be easily reset by inverting or rotating the meter case through about 180° which will empty the mercury from the cup element and it will accumulate along the interior edge of the meter case. Upon returning the meter to its operating position, the mercury will move along the interior edge of the meter case and back into the mercury reservoir.

A more detailed description of an ampere-hour meter made in accordance with this invention is provided by referring to the drawings, in which identical parts will be designated by the same numeral in both figures. FIGURE 1 is a front view of an ampere-hour meter of this invention in which a plastic meter case 10 is mounted in a mounting plate 11. The mounting plate 11 can be prepared from any suitable material such as metal (as shown), plastic, hard rubber, etc. The meter 10 should be fastened in the mounting plate 11 in such a manner that it is rotatable for about 180° for resetting the meter. The meter 10 should have a friction fit in the mounting plate 11 so that it can be placed in and maintain a level position. As clearly illustrated in FIGURE 2, the meter case 10 is cast in two parts, a back piece 12 and a transparent face piece 13. The face piece 13 must be transparent in order that a scale and pointer are visible. The back piece 12 may be molded so as to have a retaining ring 14 which fits within the mounting plate 11. Near the top of the back piece 12 there is a fill hole 15 through which mercury 16 and electrolyte 17 may be poured. The electrolyte and mercury may be sealed in the meter case by inserting a screw 18 and a gasket 19 or cementing a plug in fill hole 15. The electrolyte 17 must contain mercury ions which may be supplied by any mercury salt. A particularly preferred electrolyte comprises an aqueous solution of mercuric iodide ($HgI_2$) and potassium iodide (KI), e.g. 225 grams of $HgI_2$ and 750 grams of KI per liter of solution, which is commonly called potassium tetra iodo mercurate ($K_2HgI_4$ or $2KI\text{-}HgI_2$).

Figure 2:
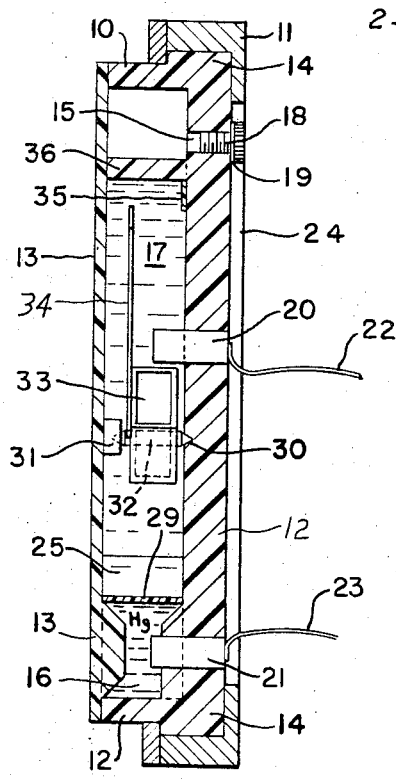
FIGURE 2 is a sectional view taken along line 2—2 of FIGURE 1.

Inserted into the back piece 12 of the meter case are two electrodes, an upper electrode 20 in contact with the electrolyte 17 and a lower electrode 21 in contact with the mercury 16 in a mercury reservoir. These electrodes may be carbon electrodes. The size, shape and positioning of the electrodes 20 and 21 should be such that the internal resistance of the meter is kept to a minimum. As shown in FIGURE 2, the electrodes 20 and 21 may be electrically connected to wires 22 and 23 from the battery circuit by spot welding the wires to the electrodes. It will be apparent to those skilled in the art that numerous means may be used to electrically connect electrodes 20 and 21 to the battery circuit. The mounting plate 11 has a circular portion 24 removed to provide for rotating the meter case to reset it.

As mentioned above, at the bottom of the meter case there is a mercury reservoir containing mercury 16 and into which the lower electrode 21 projects. The sides of the reservoir are formed by two plastic members 25 and 26 which are spaced a slight distance from the edge of the meter case to form channels 27 and 28 via which the mercury can get to the reservoir when the meter is filled or reset. Though not shown in the drawings, it should be obvious that the plastic members 25 and 26 extend from the back piece 12 to the face piece 13 of the meter case. Over the top of the mercury reservoir there is an ion permeable membrane 29 which prevents the mercury in the reservoir from splashing but which will permit mercury ions to pass into the electrolyte.

Molded into the back piece 12 and the front piece 13 of the meter case below the upper electrode 17 there are bearing surfaces 30 and 31 upon which is rotatably mounted a pivoted plastic shaft 32 having a cup element 33 firmly attached thereto. Firmly attached to the cup element 33 is a pointer 34. The pointer 34 points toward a calibrated scale 35 which indicates whether the battery is fully charged (C), completely discharged (D) or partially charged. As shown in FIGURE 1, the cup element 33, which catches the mercury deposited on the upper electrode 20, is empty which should indicate a fully charged battery and the pointer 34 is pointing to C. When the ampere-hour meter is connected to a battery which is to be discharged, mercury will be deposited on the upper electrode 20 as the battery discharges and the mercury will drop into the cup element 33. This will unbalance the cup element 33 which will then rotate on the pivoted shaft 32 causing the pointer 34 to move along the scale 35. When the battery is completely discharged, the pointer 34 will point to D on the scale 35.

Thereafter, the ampere-hour meter can be reset by rotating the meter case 10 through about 180° which empties the mercury from the cup element 33. As the meter case 10 is returned to operating position, the mercury can travel along the edge of the meter case, through either channel 27 or 28 and back into the mercury reservoir. It should be noted in FIGURE 2 that the meter case 10 projects a substantial distance from the mounting plate 11 which enables one to easily grasp the meter case for the purpose of rotating it to reset the meter.

An additional feature of a preferred embodiment of the ampere-hour meter is the inclusion of a baffle plate 36 within the meter case and located near the top of the case. The baffle plate 36 should be so located that the electrolyte 17 just touches the bottom of the plate when the ampere-hour meter is level, and there should be sufficient air space above said baffle plate to provide for expansion and contraction of the electrolyte. In this manner the baffle plate can serve as a level indicator for the meter. If the meter is not level, this will cause an error in the indication. In addition, the baffle plate also helps to supress the movement and splashing of electrolyte when the ampere-hour meter is subjected to vibration.

It will be apparent to those skilled in the art that the configuration and materials of construction can be readily modified and still remain within the scope of this invention.

Having completely described this invention, what is claimed is:

1. An ampere-hour meter comprising:
    (a) A meter case having a transparent face piece and a back piece which are firmly attached by a side wall in such a manner as to form an enclosed space;
    (b) said meter case having a filling means which is sealed after the desired amount of mercury and electrolyte are placed in said meter case;
    (c) an upper electrode firmly attached to said back piece and in contact with an electrolyte containing mercury ions within said meter case;
    (d) a lower electrode firmly attached to said back piece and covered with mercury in a mercury reservoir at the bottom of said meter case;
    (e) said mercury reservoir comprising two spaced members in contact with both the face piece and back piece, said members spaced from said side wall to form channels, an ion permeable membrane attached to the top of said members to separate the mercury from the electrolyte, and said mercury being present in sufficient amount that said lower electrode remains covered with mercury throughout the operation of said ampere-hour meter;

(f) pivotally mounted cup means located between said upper and lower electrodes, positioned so as to catch all of the mercury deposited on and dropping from said electrode, and mounted in such a manner that mercury dropping into said cup means will unbalance said cup means causing said cup means to rotate; and (g) indicator means attached to said cup means being calibrated so as to indicate that a battery which is electrically connected to said ampere-hour meter is charged when said cup means is empty and is discharged when all of the mercury deposited on said upper electrode during the discharging of the battery is in the cup means.

2. An ampere-hour meter in accordance with claim 1 in which said cup means comprises a cup firmly attached to a pivoted shaft whose pivoted ends are resting in bearing surfaces located in the inner sides of said front and back pieces, said cup means being pivotally mounted.

3. An ampere-hour meter in accordance with claim 2 in which said indicator means comprises a pointer firmly attached to said cup means and which points to a calibrated scale.

4. An ampere-hour meter in accordance with claim 3 in which there is a baffle plate in contact with both said face and said back pieces near the top of said enclosed space below said fill hole, the bottom of said baffle plate being in contact with the top of said electrolyte when said baffle plate is level and sufficient air space above said baffle plate to provide for expansion and contraction of said electrolyte.

References Cited
UNITED STATES PATENTS

| | | | |
|---|---|---|---|
| 330,451 | 11/1885 | Weston | 324—93 |
| 702,848 | 6/1902 | Wright | 324—94 |
| 1,156,826 | 10/1915 | Tuttle | 324—94 |

RUDOLPH V. ROLINEC, *Primary Examiner.*

WALTER L. CARLSON, *Examiner.*

J. J. MULROONEY, E. F. KARLSEN,
*Assistant Examiners.*